(12) United States Patent
Suda

(10) Patent No.: US 6,592,046 B2
(45) Date of Patent: Jul. 15, 2003

(54) THERMOSTAT DEVICE

(75) Inventor: Hiroshi Suda, Kiyose (JP)

(73) Assignee: Nippon Thermostat Co., Ltd., Kiyose (JP)

( * ) Notice: Subject to any disclaimer, the term of this patent is extended or adjusted under 35 U.S.C. 154(b) by 0 days.

(21) Appl. No.: 09/926,836

(22) PCT Filed: Feb. 21, 2001

(86) PCT No.: PCT/JP01/01279
§ 371 (c)(1),
(2), (4) Date: Mar. 15, 2002

(87) PCT Pub. No.: WO01/83961
PCT Pub. Date: Nov. 8, 2001

(65) Prior Publication Data
US 2002/0104892 A1 Aug. 8, 2002

(30) Foreign Application Priority Data
Apr. 28, 2000 (JP) .......................... 2000-169766

(51) Int. Cl.[7] ........................... F01P 7/02; G05D 23/19
(52) U.S. Cl. ..................................... 236/34.5; 236/68 R
(58) Field of Search ............................. 236/34.5, 68 R

(56) References Cited

U.S. PATENT DOCUMENTS

| | | | | |
|---|---|---|---|---|
| 5,294,046 A | * | 3/1994 | Fishman ..................... | 236/34.5 |
| 5,385,296 A | * | 1/1995 | Kurz et al. ................. | 236/34.5 |
| 5,676,308 A | * | 10/1997 | Saur .......................... | 236/34.5 |
| 5,775,270 A | * | 7/1998 | Huemer et al. ............ | 123/41.1 |
| 5,979,778 A | * | 11/1999 | Saur .......................... | 236/34.5 |
| 5,992,755 A | * | 11/1999 | Kuze ........................ | 241/261.2 |

FOREIGN PATENT DOCUMENTS

| | | |
|---|---|---|
| JP | 136827/1982 | 2/1982 |
| JP | 49220/1985 | 4/1985 |
| JP | 10-220633 | 8/1998 |
| JP | 11-82020 | 3/1999 |

* cited by examiner

Primary Examiner—William E. Tapolcai
(74) Attorney, Agent, or Firm—Oblon, Spivak, McClelland, Maier & Neustadt, P.C.

(57) ABSTRACT

Provided is a thermostat device enabling stable valve element operation and capable of preventing overshoots and hunting, and which enables the miniaturization of the thermostat device itself. Inside the housing of a bottom bypass-type thermostat device comprising a main valve element on the main body and a bypass valve element on the bottom side, the main valve element and bypass valve element are supported by a main shaft supported at the piston tip of a thermoelement, the temperature sensor of the thermoelement is disposed on the main shaft such that it does not directly contact the cooling water from the radiator outlet and senses the temperature by contacting a portion of the cooling water from the engine outlet, and the temperature sensor is equipped with a heating element. A bypass flow channel for bypassing the circulating fluid is formed at the downstream side of the valve element that enables control the opening/closing of the main valve element and bypass valve element according to the cooling water temperature and of opening/closing of the valve element by application of the heating element.

14 Claims, 6 Drawing Sheets

FROM ENGINE

TO ENGINE

THERMOSTAT DEVICE

BACKGROUND OF THE INVENTION

1. Field of the Invention

The present invention generally relates to a thermostat device for cooling internal combustion engines, and particularly to a thermostat device having a small hydraulic resistance in comparison to conventional thermostats, and capable of immediately warming the cooling water for controlling the activation of the valve element regardless of the cooling water temperature at the time of starting the engine and seeking improved fuel consumption of the engine thereby.

2. Description of the Related Art

A thermostat device disposed in the cooling system of an internal combustion engine and the like comprises a sensor case having a thermally expanding body built therein which expands/contracts by sensing the temperature change in the cooling water filled in the circulation flow channel of the cooling system, conducts the opening/closing of the valve element pursuant to the volume change concurrent with the expansion/contraction of such thermally expanding body, and functions to retain the cooling water at a prescribed temperature.

FIG. 7 shows an example of a conventional thermostat device, and this thermostat device 1A comprises a thermostat activation unit 30, which is the actuator of the valve element, inside the valve housings 31, 32 structured of two members. This thermostat activation unit 30 is fixed to the valve housing 32, activates the first valve element 33 and the second valve element 35 (bypass valve) with an activation piston 9 built in the thermostat activation unit 30, and controls the main flow channel 34 and the bypass flow channel 36.

The housing 37 of the thermostat activation unit 30 is retained with a holder 39, and this holder 39 encircles, in a cap shape, the end opposite to the side in which the aforementioned activation piston is protruding in the housing 37. The cap-shaped holder 39 is supported with the valve housing 32.

A pot-shaped center area is provided at the cross section of the first valve 33, and the thermostat activation unit 30 is disposed at the center thereof. This center area blocks the main flow channel 34 together with the holder 39 with the first valve element 33 being in a closed position.

A bolt 38 is provided on the axial extension of the activation piston (not shown) of the thermostat activation unit 30, and the second valve element 35 (bypass valve) is mounted on this bolt 38 with a slide guide, thereby enabling the opening/closing of the bypass flow channel 36. The second valve element 35 (bypass valve) is energized with a spring member 41. The first valve element 33 is energized with a spring member 40, and this spring member is supported with the valve housing 31.

The thermostat device 1A structured as described above is disposed so as to allow the cooling water from the engine to circulate from the bypass flow channel 36 to the engine upon inflowing from a sleeve 42, or to circulate to the radiator via a sleeve 43.

The cooling water inflowing from the bypass 36 is returned directly to the engine since the cooling water is of a low temperature prior to the air becoming warm at the time of starting the engine.

When the cooling water reaches a prescribed temperature after the warm air operation, the wax inside the housing 37 expands pursuant to this temperature and extends the activation piston (not shown) of the thermostat activation unit 30. Pursuant to this extension of the activation piston, the first valve element 33 resists the energization of the spring member 40, comes down, and releases the main flow channel from the blocked state into an open state, and the second valve element 35 (bypass valve) blocks the bypass flow channel 36. Thus, the cooling water inflowing from the sleeve 42 flows into the radiator via the sleeve 43.

Furthermore, in order to forcibly expand the wax inside the housing 37, this structure provides a heating unit 44 to the housing 37, and protrudes this heating unit 44 from the valve housing 32 for connection with a superheating element 45.

Incidentally, with this type of conventional thermostat device 1A, since the housing 37, which is the temperature sensor of the cooling water, is disposed inside the cooling water flow channel, the hydraulic resistance of the cooling water inflowing from the sleeve 42 becomes large, and it is thereby difficult to miniaturize the water pump for forcibly circulating the cooling water.

Moreover, there are cases where a hunting phenomenon would arise when the cooling water from the engine and the cooling water from the radiator are mixed in the vicinity of the housing 37 during the warm air operation at the time of starting the engine. When this type of phenomenon arises, the cooling water temperature inflowing to the engine becomes unstable, and it is difficult to improve the fuel consumption and to seek the immediate warming of the cooling water. As a preventive measure, it is necessary to add a twist to the structure of the valve housing 32 in order to mix the cooling water immediately before the housing 37, which is the temperature sensor, or to mount a current plate such as a so-called interruption plate.

In addition, when this thermostat device 1A is disposed as an entrance control unit, it may sense the cooling water inflowing from the engine, and there were cases of malfunctions such as overshoots and so forth.

Thus, the thermostat device according to the present invention was devised in view of the foregoing problems, and an object thereof is to provide a thermostat device capable of immediately warming the cooling water even at the time of starting the engine and improving the fuel consumption, and wherein the cooling water has a small hydraulic resistance.

SUMMARY OF THE INVENTION

The thermostat device of the present invention has a structure wherein, inside the housing of a bottom bypass-type thermostat device comprising a main valve element on the main body and a bypass valve element on the bottom side, the main valve element and bypass valve element are supported by a main shaft supported at the piston tip of a thermoelement, the temperature sensor of the thermoelement is disposed such that it does not directly contact the cooling water from the radiator outlet and senses the temperature by contacting a portion of the cooling water from the engine outlet, the temperature sensor is equipped with a heating element, and the opening/closing of the main valve element and bypass element pursuant to the cooling water temperature as well as the control of the opening/closing of the valve element pursuant to the application of said heating element are freely conducted thereby.

According to this type of structure, it is possible to prevent the hunting phenomenon caused by the cooling water from the engine during the warm air operation at the time of starting the engine, and to improve the fuel consumption as well as to seek the immediate warming of the cooling water. Thus, it is not necessary to improve the structure of the valve housing or to mount a current plate in order to mix the cooling water immediately before the housing, which is the temperature sensor.

Furthermore, formed on the housing are a first inflow sleeve to which a part of the cooling water from the engine outlet inflows, a second inflow sleeve to which the cooling water from the radiator inflows, a sub flow channel for outflowing a part of the cooling water from the first inflow sleeve to the cooling water main flow channel or bypass flow channel inside the engine, and a main flow channel for outflowing the cooling water from the radiator to the cooling water main flow channel inside the engine.

By forming the respective flow channels inside the housing as above, the internal structure of the thermostat may be simplified, and resin materials such as heat-resistant plastic may be manufactured integrally with the housing itself. This will allow the thermostat device to be compatible with units.

Moreover, the main valve is disposed above the bypass valve, the thermoelement is disposed thereabove, and the first inflow sleeve is provided in between the thermoelement and the main valve.

According to the aforementioned structure, it is no longer necessary to dispose the thermoelement in the cooling water flow channel inside the housing, the hydraulic resistance of the cooling water can be decreased, and the structure of the thermostat device can be simplified. Further, by changing the flow volume of the sleeve 1; that is, the diameter of the sleeve, and changing the flow volume rate with the other flow channels, the response of the thermoelement can be easily changed. The balance with the heat value of the heating element can also be easily adjusted.

In addition, the thermoelement is disposed such that the cooling water from the first sleeve only contacts a part of the thermoelement temperature sensor, and the heating element is provided on the outside of the cooling water channel via a seal member.

With this type of structure, the amount of cooling water in which the thermoelement is to sense the temperature thereof may be easily changed by merely changing the internal structure of the housing, and response of the thermoelement can also be easily changed thereby. Moreover, the balance with the heat value of the heating element can also be easily adjusted.

Further, by disposing the heating element outside the cooling water flow channel, electrical reliability and maintenance can be improved.

DESCRIPTION OF THE PREFERRED EMBODIMENTS

Embodiments of the thermostat device according to the present invention are now explained with reference to the attached drawings.

Figure 1:
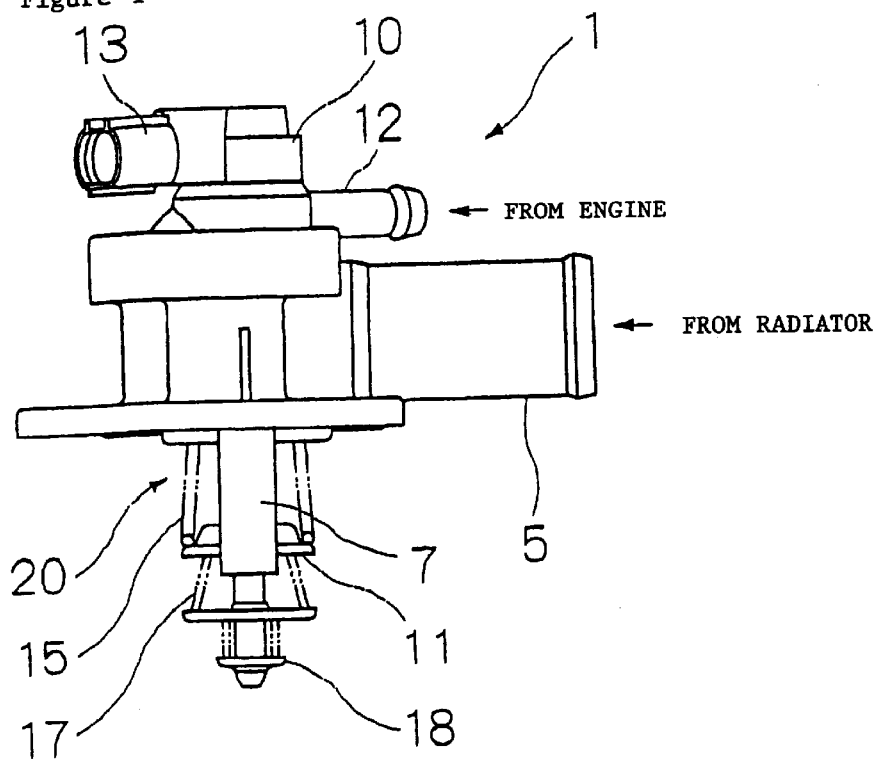
FIG. 1 is a side view showing the first embodiment of the thermostat device according to the present invention.
Figure 2:
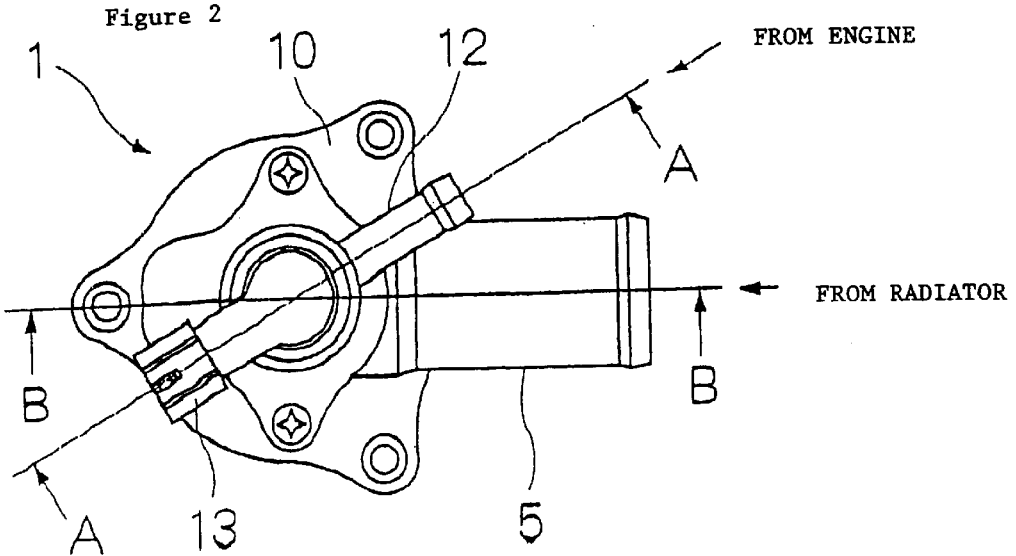
FIG. 2 is a plan view of the thermostat device shown in FIG. 1.
Figure 3:
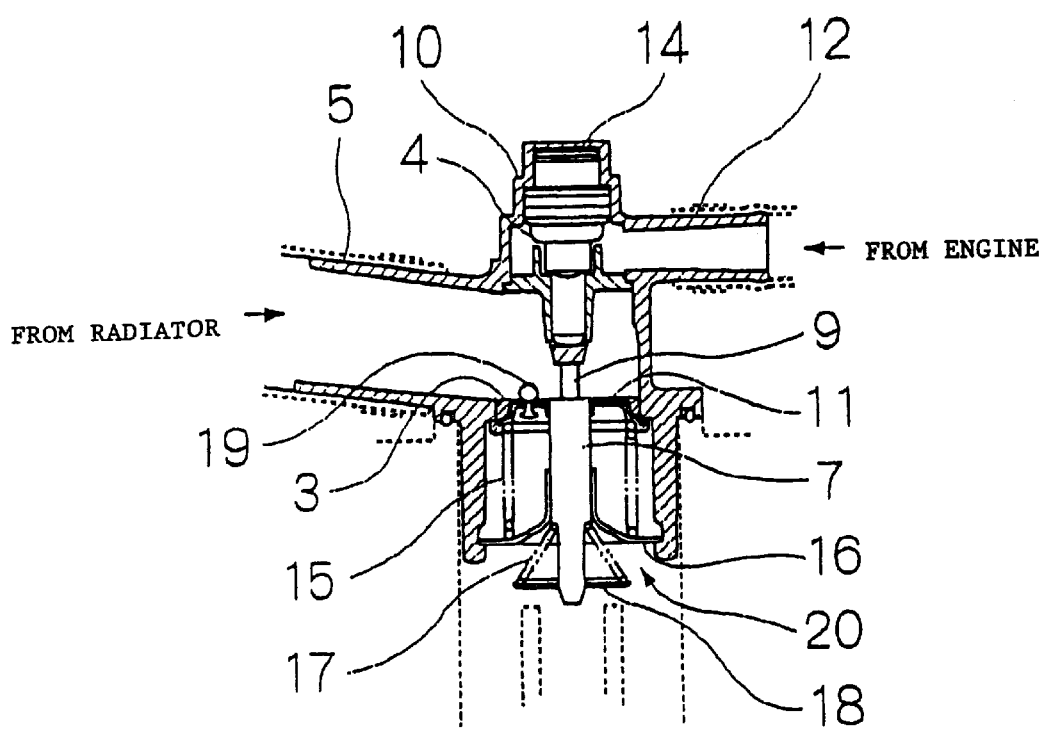
FIG. 3 is a cross section viewed along line A—A in FIG. 2.
Figure 4:
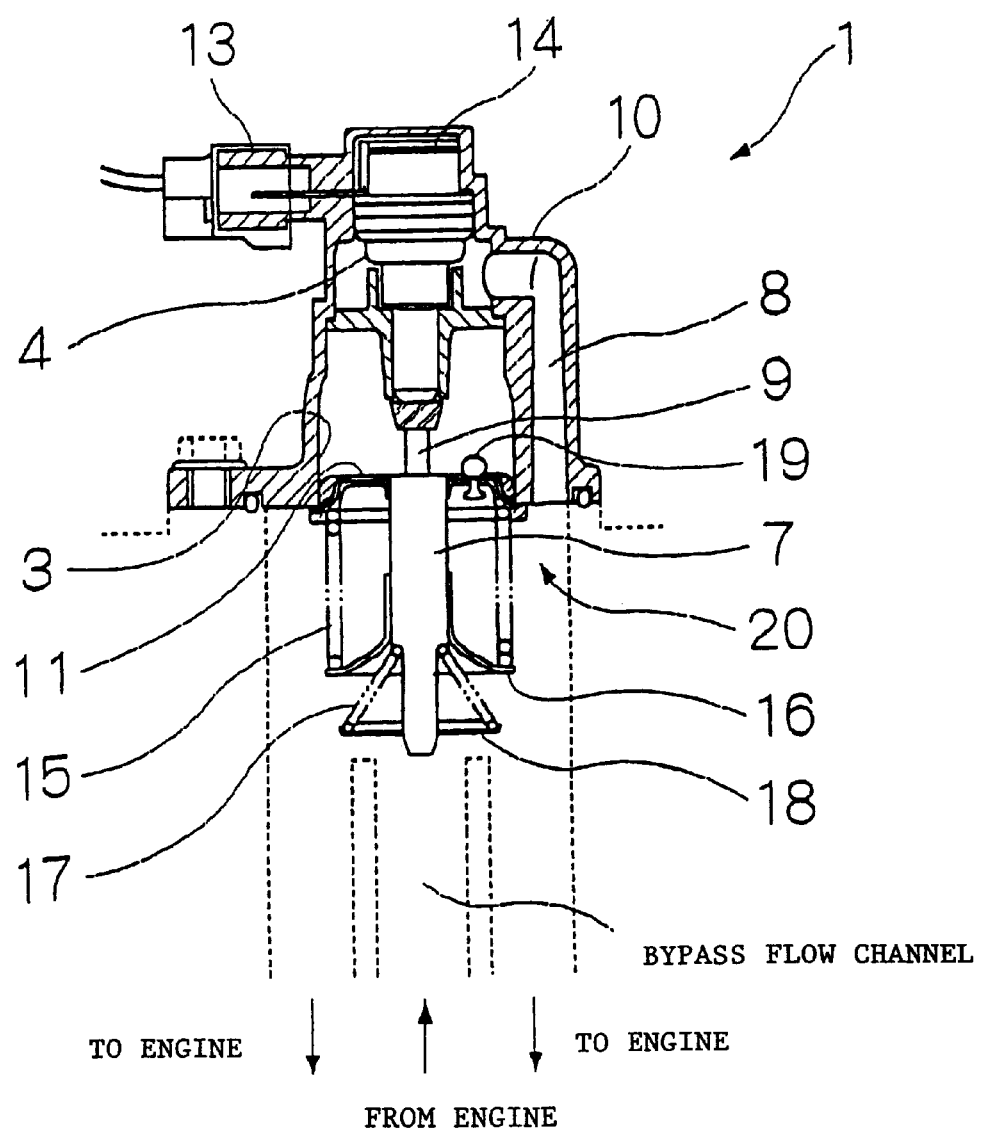
FIG. 4 is a cross section viewed along line B—B in FIG. 2.
Figure 5:
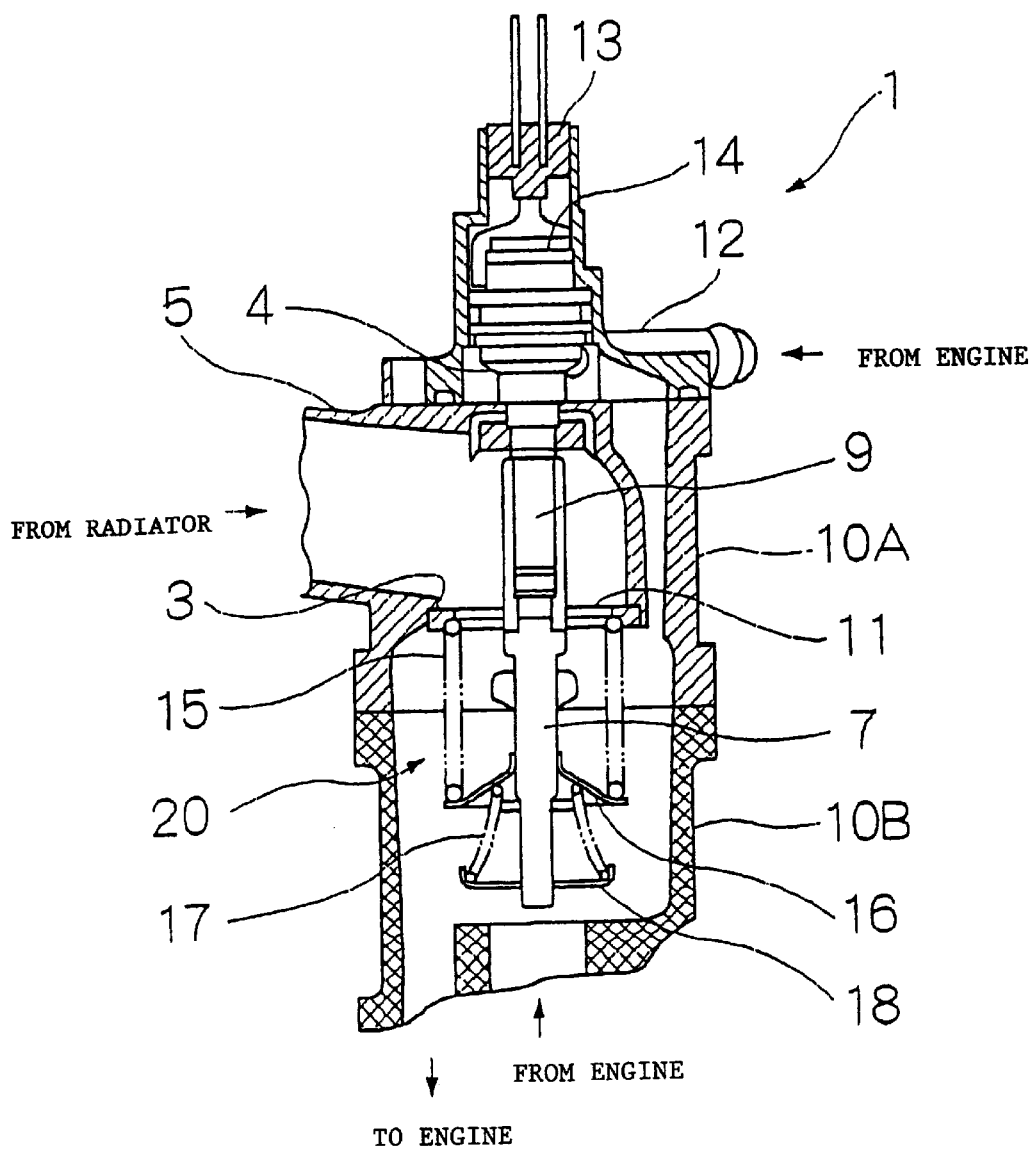
FIG. 5 is a longitudinal cross section showing the second embodiment of the thermostat device according to the present invention.
Figure 6:
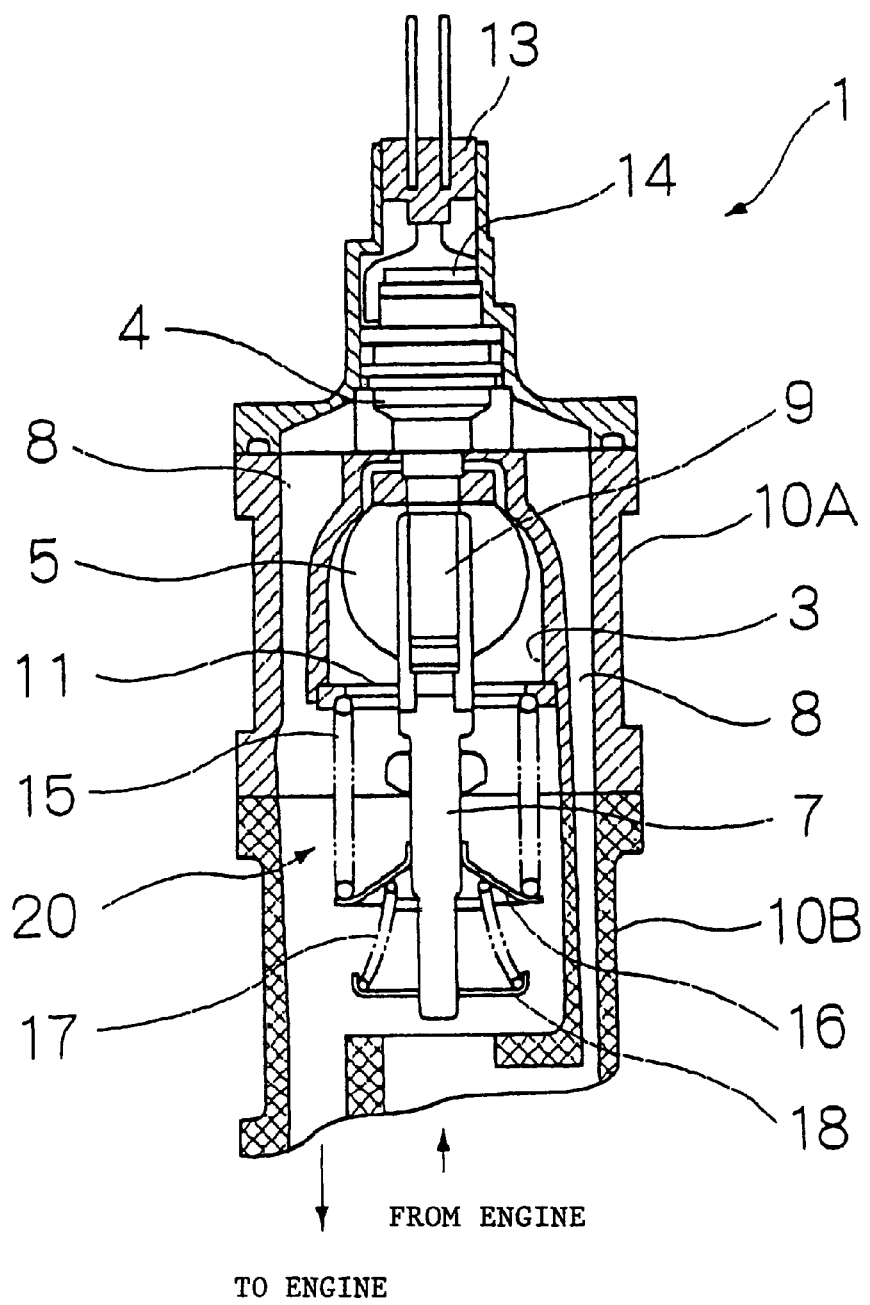
FIG. 6 is a cross section showing the second embodiment.
Figure 7:
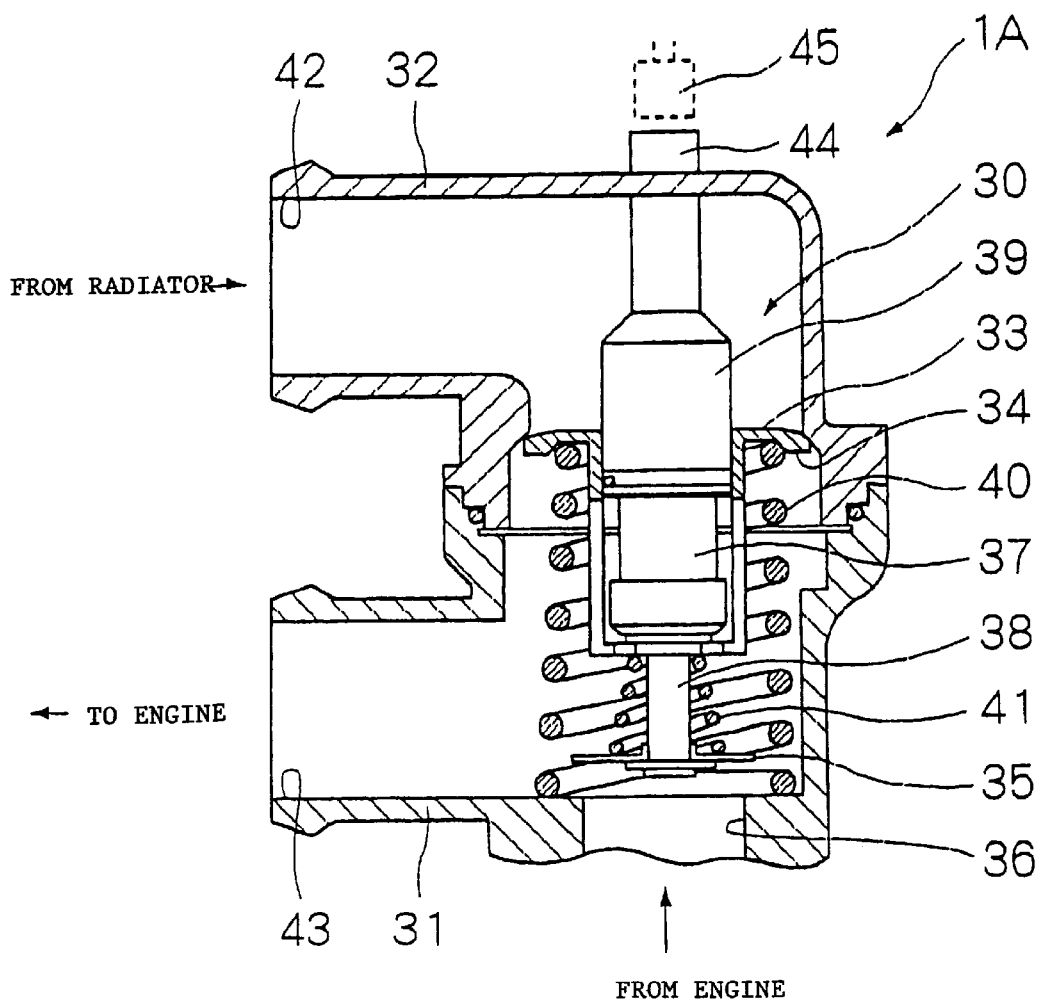
FIG. 7 is a cross section of a poppet-type thermostat device comprising a conventional bypass structure.

FIGS. 1 to 6 depict the embodiments of the thermostat device according to the present invention, and FIGS. 1 to 4 illustrate the first embodiment, whereas FIGS. 5 and 6 illustrate the second embodiment.

The thermostat device 1 of the first embodiment shown in FIGS. 1 to 4 is structured of a main body housing 10 formed integrally with a resin material such as heat-resistant plastic, and a valve actuator 20 for opening/closing the main valve element 11 and the bypass valve element 18 on the bottom side by expanding the wax (not shown), which is the temperature sensor of the cooling water, built in the element 4. The housing 10 and valve actuator 20 are now respectively explained in detail.

(1) Housing 10

The housing 10 of the thermostat device 1 is injection molded with a resin material such as heat-resistant plastic so as to be capable of sufficiently enduring the temperature of the cooling water of an elevated temperature as described above. Moreover, depending on the usage, it may also be made from metal.

Formed on the housing 10 are a bypass sleeve 12 for directly inflowing the cooling water to the thermostat device 1 at the time of starting the engine, a main sleeve 5 for inflowing the cooling water from the radiator to the thermostat device 1 after the warm air operation of the engine, a sub flow channel 8 for outflowing the cooling water inflowing from the bypass sleeve 12 which contacted a part of the temperature sensor to the engine, and a main flow channel 3 (c.f. FIG. 4) for outflowing the cooling water from the radiator to the engine.

Further, a reverse concave-shaped element housing capable of retaining the element 4 itself is formed inside the housing 10 at a position such that the cooling water inflowing via the bypass sleeve 12 only contacts a portion of the temperature sensor. Also, a connector 13 for supplying electricity to the heating element 14 that forcibly heats the element 4 is formed on the outside of the housing 10.

(2) Valve Actuator 20

The valve actuator 20 is structured of an element 4 having a function of extending the piston 9 by expanding the built-in wax by sensing the temperature of the cooling water, a main shaft 7 connected to the tip of the piston 9, and a main valve element 11 and bypass valve element 18 supported by this main shaft 7.

A discoid frame 16 is fixed between the main valve element 11 and bypass element 18 of the main shaft 7, and a main spring 15 for energizing the main valve element 11 is fixed between the frame 16 and main valve element 11. Moreover, a bypass spring 17 for energizing the bypass valve element 18 is fixed at the lower position of the frame 16 of the main shaft 7. Further, a jiggle valve 19 is disposed at an appropriate position of the main valve element 11, and plays the role of releasing air at the time of pouring the cooling water.

A heating element 14 is mounted on the head portion of the element 4 at a position which will not contact the cooling water, and the valve actuator 20 may be controlled by applying this heating element 14. Pursuant to the output signal from the ECU (not shown) in accordance with the operational status of the engine, for example, it will be possible to open the valve early when the engine load becomes high and the temperature of the cooling water becomes high in connection therewith, or to control the engine itself such as by cooling the engine and so forth by making the lift volume higher than usual.

A Nichrome heater, PTC element, Peltier element, and so on may be used as the heating element 14, and may be selected in accordance with the usage.

(3) Working of Thermostat Device 1

When the cooling water is cool such as at the time of staring the engine, the cooling water outflowing from the engine outlet inflows from the bypass sleeve 12 of the housing 10 of the thermostat device 1 into the thermostat device 1. The cooling water inflowing into the thermostat device 1 contacts the element 4 of the valve actuator 20, and thereafter directly inflows into the bypass side of the engine block via the sub flow channel 8 since the bypass flow channel of the engine block is in an open state as a result of the bypass valve element 18 of the valve actuator 20 being in a so-called open valve state.

Meanwhile, the cooling water outflowing from the engine outlet inflows into the radiator, and the cooling water from this radiator also inflows into the inside of the thermostat device 1 from the main sleeve 5. Nevertheless, as the main flow channel 3 is blocked with the main valve element 11 energized by the energization of the main spring 15, the cooling water from the radiator is not able to outflow to the engine.

When this condition continues, the cooling water that does not go through the radiator is warmed rapidly. When the cooling water reaches a prescribed temperature, the wax of the element 4 senses the water temperature of this cooling water and begins to gradually expand. The piston 9 extends pursuant to this expansion of the wax, and the main shaft 7 connected via the piston 9 also extends.

When the main shaft 7 extends, the main valve element 11 supported by this main shaft 7 resists the energization of the main spring 15, comes down, releases the main flow channel 3 which was in a blocked state, and outflows the cooling water from the radiator to the engine. Meanwhile, the bypass valve element 18 supported by the end of the main shaft 7 blocks the flow channel from the other parts of the engine pursuant to the extension of the main shaft 7.

Moreover, the inflow of the cooling water from other parts of the engine near the bypass sleeve 12 is conducted as is in order for the thermoelement to sense the temperature.

The thermostat device 1 illustrated in FIGS. 5 and 6 depict the second embodiment. With this thermostat device, although the structure of the valve actuator 20 is the same as that of the thermostat device 1 explained in the first embodiment, it differs in that the housing 10 alone is directly mounted on the engine.

The structure is such that a lower housing 10B is mounted on an upper housing 10A, and, by making the housing structure as described above, the housing may be mounted on any type of engine regardless of the engine structure.

As described above, according to the thermostat device of the present invention, it is possible to reduce the hydraulic resistance of the cooling water inside the housing since the element is not disposed inside the housing. As a result, the internal structure of the thermostat device can be simplified, the housing itself can be integrally manufactured with a resin material such as heat-resistant plastic, and the thermostat device is thereby compatible with units.

It is further possible to prevent the hunting phenomenon caused by the cooling water from the engine during the warm air operation at the time of starting the engine, and to improve the fuel consumption as well as to immediately warm the cooling water.

It is therefore no longer necessary to improve the structure of the valve housing or to mount a current plate in order to mix the cooling water immediately before the housing, which is the temperature sensor.

Furthermore, it is possible to vary the valve-opening temperature in accordance with the engine load or outside temperature by providing a heating element, and, the sealability is improved and the danger of electric leakage can be avoided since a harness for supplying electricity to the heating element and other elements is disposed outside the flow channel.

What is claimed is:

1. A thermostat device comprising:
   a housing having a first inflow sleeve for receiving a coolant from an engine, a second sleeve for receiving the coolant from a radiator, a main flow channel for outflowing the coolant from the radiator to an engine main flow channel, and a bypass flow channel for outflowing the coolant from the second sleeve to at least one of an engine bypass flow channel and the engine main flow channel;
   a main valve positioned to open and close the main flow channel;
   a bypass valve positioned to open and close the engine bypass flow channel from the engine;
   a main shaft supporting the main valve and bypass valve;
   a thermoelement having a temperature sensor connected to the main shaft, the temperature sensor being positioned in the first inflow sleeve such that the temperature sensor does not contact the coolant in the second inflow sleeve and senses temperature of the coolant in the first inflow sleeve; and
   a heating element positioned to heat the temperature sensor and provided outside of the first inflow sleeve.

2. A thermostat device according to claim 1, wherein:
   the main valve is disposed above the bypass valve;
   the thermoelement is disposed above the bypass valve; and
   said second inflow sleeve is provided in between the thermoelement and said main valve.

3. A thermostat device according to claim 1, wherein:
   said thermoelement is disposed such that the coolant from said first inflow sleeve only contacts a part of said temperature sensor; and
   the heating element is provided on the outside of the first inflow sleeve with a seal member interposed therebetween.

4. A thermostat device according to claim 3, wherein:
   the main valve is disposed above the bypass valve;
   the thermoelement is disposed above the bypass valve; and
   said second inflow sleeve is provided in between the thermoelement and said main valve.

5. A thermostat device according to claim 1, wherein the heating element comprises one of a Nichrome heater, a PTC element and a Peltier element.

6. A thermostat device comprising:
   a housing having a first inflow sleeve for receiving a coolant from an engine, a second inflow sleeve for receiving the coolant from a radiator, a main flow channel for outflowing the coolant from the radiator to an engine main flow channel, and a sub flow channel for outflowing the coolant from the first sleeve to at least one of an engine bypass flow channel and the engine main flow channel;

a main valve positioned to open and close the main flow channel;

a bypass valve positioned to open and close the engine bypass flow channel from the engine;

an actuator configured to actuate the main valve and bypass valve in response to temperature of the coolant in the first inflow sleeve; and a controller configured to control the actuator and provided outside the first inflow sleeve.

7. A thermostat device according to claim 6, wherein the actuator comprises a shaft connected to the main and bypass valve, and a thermoelement positioned to sense the temperature of the coolant in the first inflow sleeve and configured to actuate the shaft.

8. A thermostat device according to claim 6, further comprising a seal member positioned to partition the controller from the first inflow sleeve.

9. A thermostat device according to claim 7, wherein the controller comprises a heating device positioned to heat the thermoelement.

10. A thermostat device according to claim 9, further comprising a seal member positioned to partition the heating device from the first inflow sleeve.

11. A thermostat device according to claim 9, wherein the heating device comprises one of a Nichrome heater, a PTC element and a Peltier element.

12. A thermostat device according to claim 7, further comprising a partitioning device partially partitioning the thermoelement in the first inflow sleeve.

13. A thermostat device comprising:

a housing having a first inflow sleeve for receiving a coolant from an engine, a second inflow sleeve for receiving the coolant from a radiator, a main flow channel for outflowing the coolant from the radiator to an engine main flow channel, and a sub flow channel for outflowing the coolant from the first sleeve to at least one of an engine bypass flow channel and the engine main flow channel;

a main valve positioned to open and close the main flow channel;

a bypass valve positioned to open and close the engine bypass flow channel from the engine;

actuating means for actuating the main valve and bypass valve in response to temperature of the coolant in the first sleeve; and controlling means for controlling the actuating means, the controlling means being provided outside of the first inflow sleeve.

14. A thermostat device according to claim 13, further comprising a seal member positioned to partition the controller from the first inflow sleeve.

* * * * *